MULTI-SPEED TRANSMISSION

Original Filed March 16, 1964 6 Sheets-Sheet 1

INVENTOR.
ORLY MUSGRAVE
BY Toulmin & Toulmin
ATTORNEYS

MULTI-SPEED TRANSMISSION

Original Filed March 16, 1964 6 Sheets-Sheet 2

INVENTOR.
ORLY MUSGRAVE
BY Toulmin & Toulmin
ATTORNEYS

MULTI-SPEED TRANSMISSION

Original Filed March 16, 1964 6 Sheets-Sheet 3

INVENTOR.
ORLY MUSGRAVE
BY Albright & Albright
ATTORNEYS

MULTI-SPEED TRANSMISSION

Original Filed March 16, 1964 6 Sheets-Sheet 4

INVENTOR.
ORLY MUSGRAVE
BY Toulmin & Toulmin
ATTORNEYS

MULTI-SPEED TRANSMISSION

Original Filed March 16, 1964 6 Sheets-Sheet 5

INVENTOR.
ORLY MUSGRAVE
BY Fairbairn & Fairbairn
ATTORNEYS

MULTI-SPEED TRANSMISSION

Original Filed March 16, 1964 6 Sheets-Sheet 6

INVENTOR.
ORLY MUSGRAVE
BY
Toulmin & Toulmin
ATTORNEYS

United States Patent Office

Re. 26,633
Reissued July 29, 1969

26,633
MULTI-SPEED TRANSMISSION

Orly Musgrave, Springfield, Ohio, assignor, by mesne assignments, to Mast-Foos Manufacturing Company, Inc., Springfield, Ohio, a corporation of Ohio

Original No. 3,301,080, dated Jan. 31, 1967, Ser. No. 351,928, Mar. 16, 1964. Application for reissue Mar. 14, 1968, Ser. No. 717,480

Int. Cl. F16h *3/08, 5/06*

U.S. Cl. 74—375 18 Claims

Matter enclosed in heavy brackets [ ] appears in the original patent but forms no part of this reissue specification; matter printed in italics indicates the additions made by reissue.

*ABSTRACT OF THE DISCLOSURE*

*A multi-speed transmission housing a driving, a driven and an intermediate shaft, the driven and intermediate shafts mounting speed changing gears in mesh, there being axially movable driving dogs keyed to one of said shafts the selective adjustment of which provides for a selective drive therethrough from said driving shaft to said driven shaft, and there being separate yoke means engaging said dogs for adjustment thereof, the yoke means being under the control of a gear shift lever the position of which determines the drive provided through said transmission means, if any.*

This invention relates to transmissions and more particularly it relates to multi-speed gear transmissions having manual shift means.

The present invention is an improvement over devices of the nature referred to in that it is compact, and affords a plurality of forward speeds and a reverse speed while embodying a simple unique design.

The design includes a novel gear arrangement and means for shifting the gears of the transmission while embodying a minimum of parts thereby providing for trouble free service.

The present invention can be used in motor vehicles such as rider driven mowers, snow removers, farm vehicles, etc. stationary engine installations or wherever a compact economical multi-speed transmission is required.

The object of this invention is to provide a compact economical and trouble free multi-speed transmission.

Another object of this invention is to provide a novel gear shift mechanism to positively engage the selected speed change gear while locking the remaining speed change gears in a neutral position.

A further object of this invention is to provide a multi-speed transmission which is easily adaptable to a variety of motorized vehicles.

These and other objects and advantages will become apparent upon reading the following specification in conjunction with the attached drawings in which.

Figure 1:
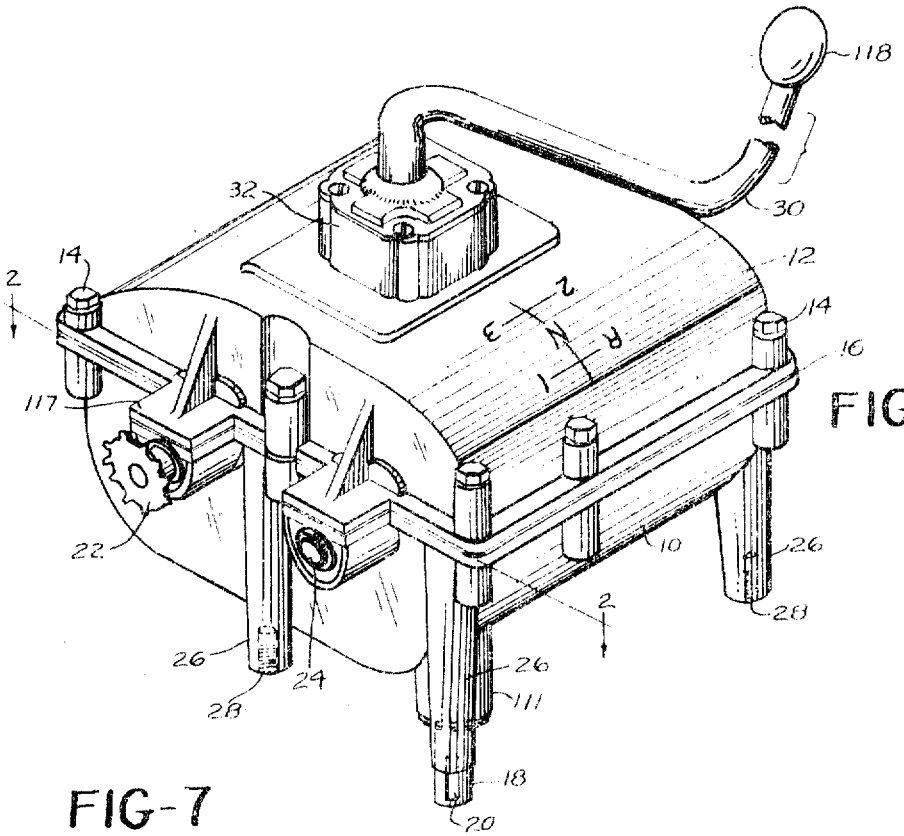
FIGURE 1 is a perspective view of the invention.

Referring to the drawings more in detail, FIGURE 1 is a perspective view of the transmission of this invention. It includes a gear housing 10 to which a cover 12 is fastened by cap screws 14. A suitable gasket 16 lies between the housing and cover. The driving shaft 18 with suitable keyway means 20 therein is shown rotatably mounted in gear housing 10. Also shown are the driven sprocket and shaft assembly generally indicated at 22 and the intermediate shaft 24.

There are suitable mounting legs 26 which are internally threaded at 28 to provide the means for mounting the transmission on a primer mover and clutch device (not shown) or a mounting platform.

Shift rod 30 and the shift rod assembly generally designated at 32 are shown attached to the cover 12. This transmission has a reverse speed and three forward speeds with the various shifting positions and neutral being indicated on cover 12.

Figure 2:
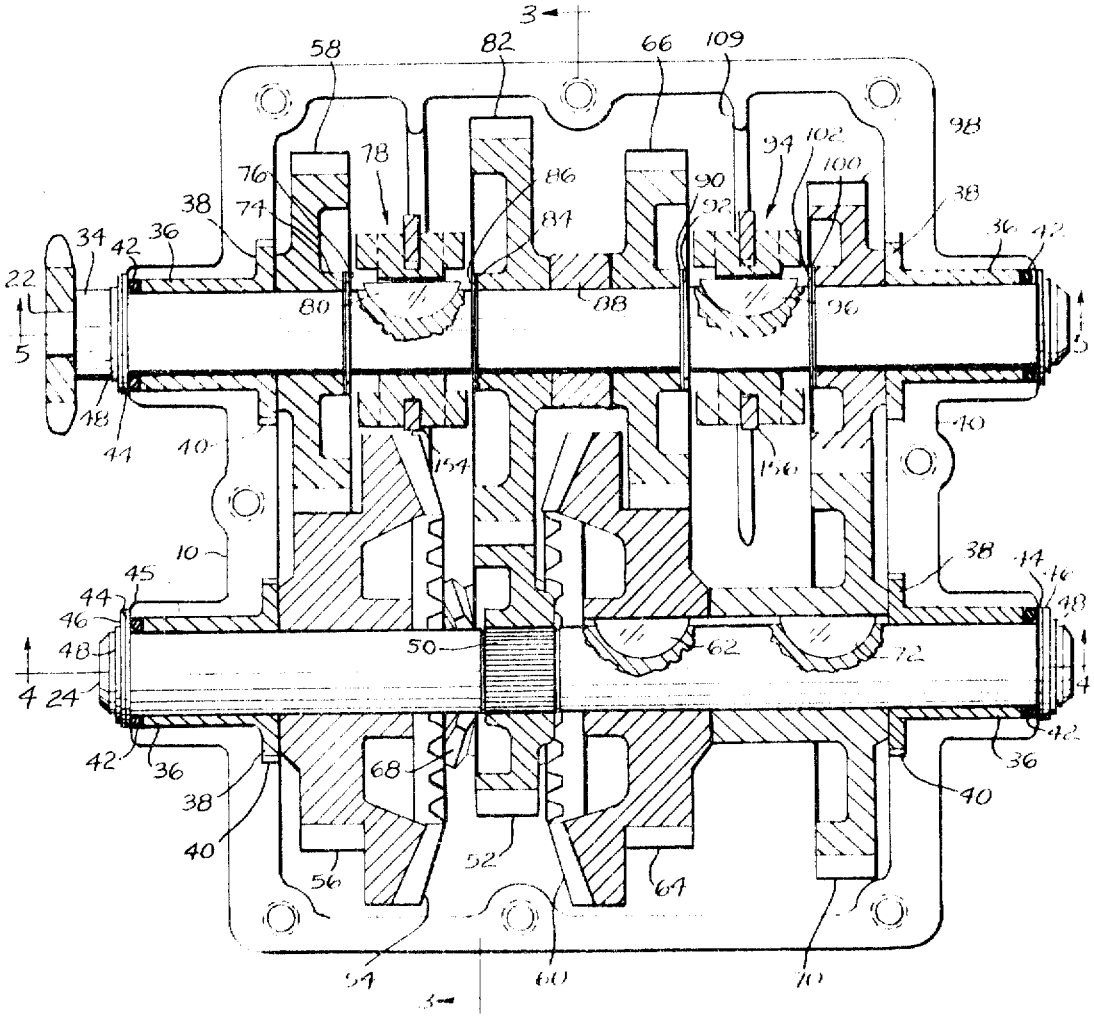
FIGURE 2 is a cross-sectional view taken along the lines of 2—2 of FIGURE 1 showing the sprocket and driven shaft assembly and the intermediate shaft and gear assembly.

FIGURE 2 is a cross sectional view of the transmission taken along the line 2—2 of FIGURE 1. As shown in FIGURE 2 intermediate shaft 24 is parallel to the sprocket and shaft rod assembly 22, which also includes driven shaft 34. These two shafts are rotatably mounted in bearings 36 which have flange means 38 which fit into mating recesses 40 of gear housing 10. Each of the bearings has an oil seal 42 on the outer end of the shafts to retain the lubricant in the housing.

Each end of the shafts 24 and 34 is secured in the housing by a steel washer 44 which abuts against the housing 10 in the area designated 45. A fiber washer 46 lies between steel washer 44 and outermost locking ring 48 which fits into a recess on the pertaining shaft end.

Shaft 24 has a knurl 50 formed thereon which knurl is in the form of small gear teeth and a spur gear 52 is press fitted on to this knurl to thereby rotate with shaft 24.

Bevel gear 54 is rotatably mounted on shaft 24 and abuts the adjacent bearing 36. Formed on bevel gear 54 is a spur gear 56 which meshes with the reversing gear 58 on shaft 34. A second bevel gear 60 is suitably fixed to rotate with shaft 24 through keyway means 62. Bevel gear 60 also has a spur gear 64 integrally formed thereon which meshes with spur gear 66 on shaft 34.

Figure 4:
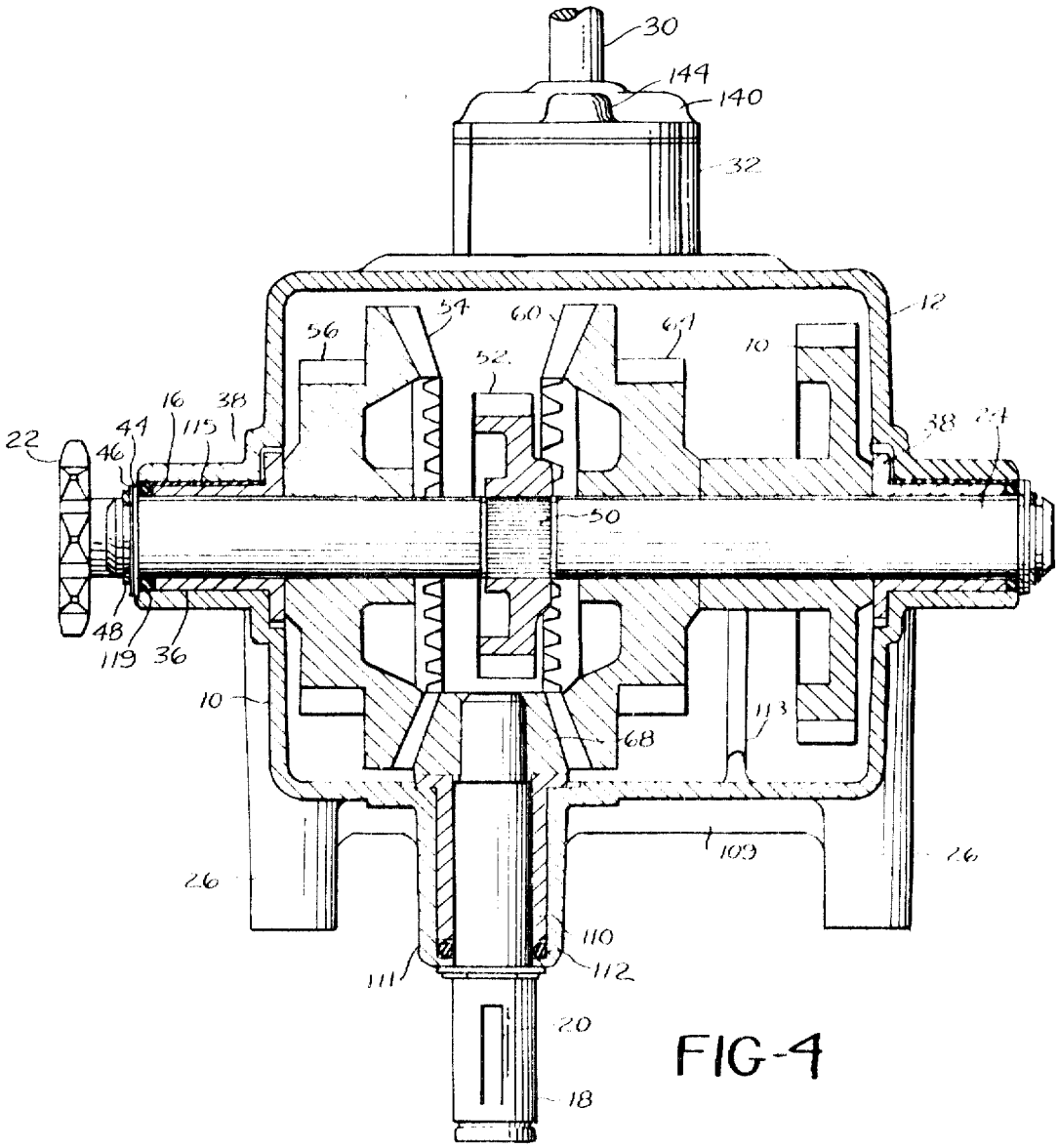
FIGURE 4 is a cross-sectional view taken along lines 4—4 of FIGURE 2 showing the pinion and shaft assembly and the intermediate shaft and gear assembly.

Bevel gears 54 and 60 are driven by pinion gear 68 which is best shown in FIGURE 4. Spur gear 70 is fixed to rotate with shaft 24 through suitable keyway means 72. Spur gear 70 abuts against bevel gear 60 and the adjacent flange 38.

Referring to the gears mounted on driven shaft 34, there is a reversing gear 58 which is rotatably mounted on shaft 34. Gear 58 abuts flange 38 on one side and it is restrained against axial movement on the other side by a fiber washer 74 and locking ring 76, which ring fits into a mating recess on shaft 34.

Adjacent to the reversing gear 58 is a first driving dog generally indicated at 78 which is fixed to rotate with shaft 34 through keyway means 80; however, the driving dog 78 is shiftable axially along keyway means 80 to selectively engage reversing gear 58 or first speed gear 82, as will be described hereinafter.

First speed gear 82 is rotatably mounted on shaft 34 and is fixed against axial movement on one side by fiber washer 84 and locking ring 86 which ring fits into a suitable recess on shaft 34.

Second speed gear 66 is rotatably mounted on shaft 34 and is separated from the first speed gear 82 by a spacer bushing 88. Gear 66 is restrained against axial movement on one side by a fiber washer 90 and locking ring 92. Gear 66 and gear 82 both abut against bushing 88 as shown.

A second driving dog generally indicated at 94 is fixed to rotate with shaft 34 through a suitable keyway means 96; however, the driving dog 94 is axially shiftable on shaft 34 to selectively engage gear 66 or spur gear 98, as will be described hereinafter.

A third forward speed gear 98 is rotatably mounted on shaft 34 and abuts against flange 38 on one side and is fixed against axial movement on the other side by fiber washer 100 and locking ring 102, which ring fits into a suitable recess on shaft 34.

Figure 9:
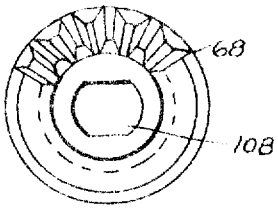
FIGURE 9 shows a plan view of the driving pinion.
Figure 8:
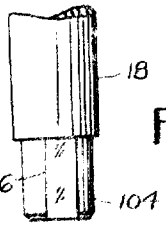
FIGURE 8 shows the side view and FIGURE 8A shows a top view of the driving shaft.
Figure 8A:
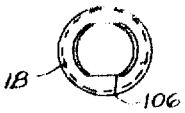
Figure 3:
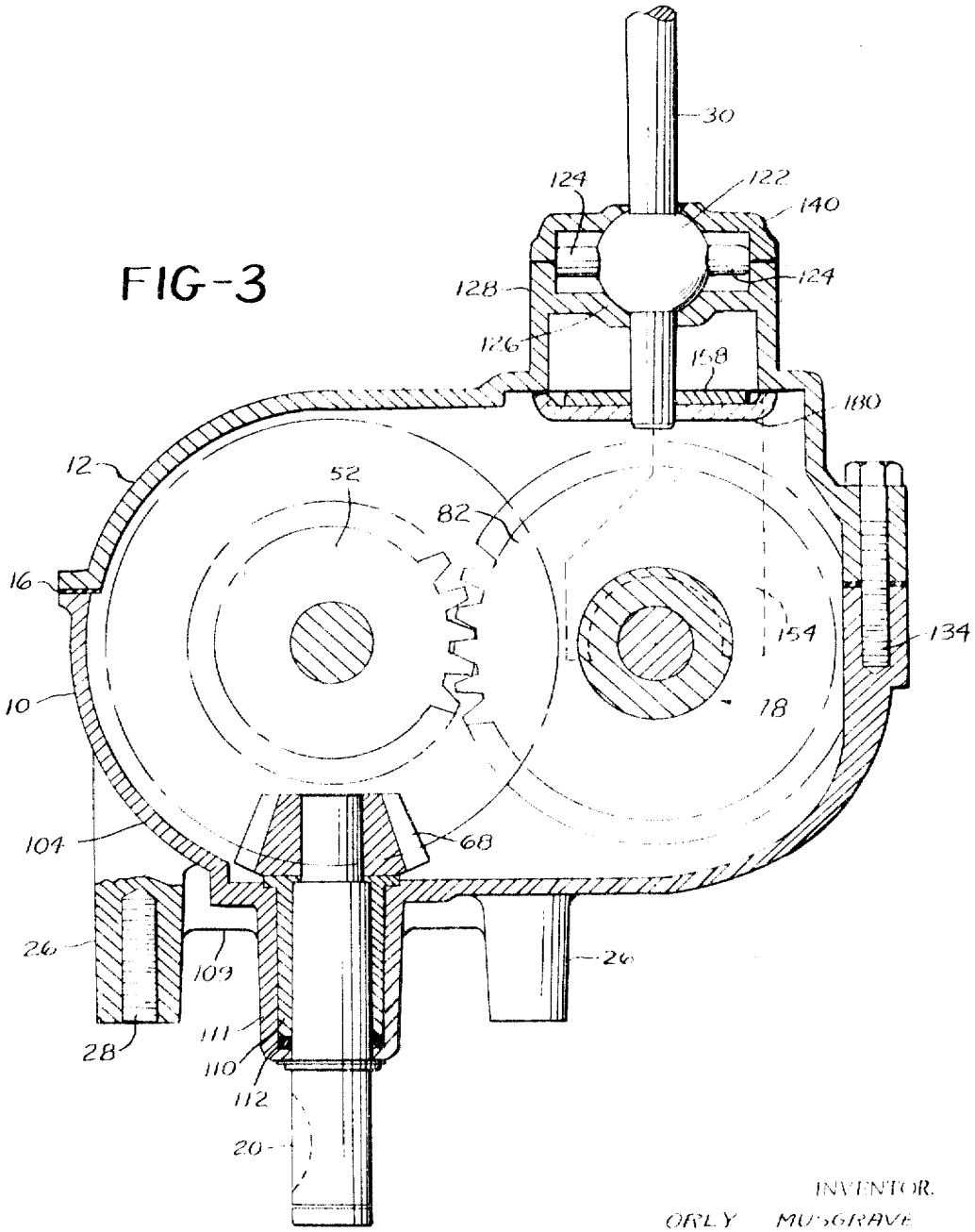
FIGURE 3 is a cross-sectional view taken along lines 3—3 of FIGURE 2 showing the input pinion and shaft assembly and the shift rod assembly.

FIGURES 3 and 4 show how driving pinion 68 is mounted on driving shaft 18. Driving shaft 18 has a reduced diameter portion 104 which is better shown in FIGURES 8 and 8A. This reduced diameter portion 104 has two flats 106 on its surface. These flats 106 mate with similar flats 108 on pinion 68 as shown in FIGURE 9 to drive the gear. A portion of the extreme outer end of reduced portion 104 of shaft 18 can be peened over the top area of pinion 68 to retain the pinion on the shaft 18. The pinion and shaft are then inserted in bushing 110 which fits into the portion 111 of gear housing 10. Suitable oil ring seal 112 is present as shown. A fiber washer 114 and suitable locking ring 116 which fits into a mating recess on shaft 18 retains the shaft in the housing.

FIGURE 4 also shows the bearing sleeves 36 which have a flat area 115 which mate with the flat reinforced area 117 of cover 12 shown in FIGURE 1. There are suitable oil seals 119 at the outer ends of the housings 36 to retain the oil in the transmission. Suitable reinforcing ribs 109 are shown on the outside of the gear housing 10 and suitable reinforcing ribs 113 appear on the inside of the housing 10.

In the specific embodiment of this invention shown in the drawings, the following chart shows the number of teeth for the various gears used:

| | Teeth |
|---|---|
| Sprocket **22** | 8 |
| Spur gear **52** | 24 |
| Bevel gears **54** and **60** | 42 |
| Spur gears **56** and **64** | 30 |
| Spur gear **58** | 30 |
| Spur gear **66** | 30 |
| Pinion gear **68** | 15 |
| Spur gear **70** | 36 |
| Spur gear **82** | 36 |
| Spur gear **98** | 24 |

Figure 5:
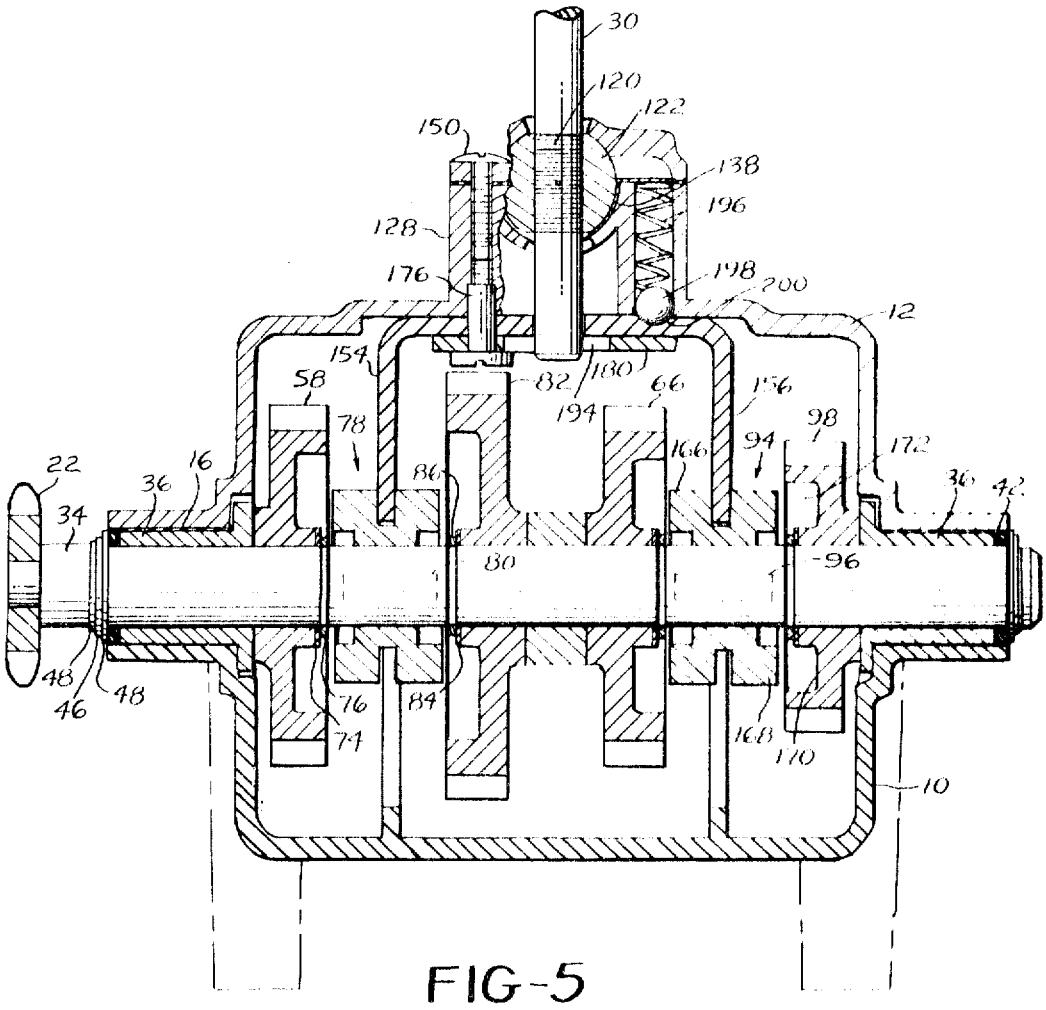
FIGURE 5 is a cross-sectional view taken along lines 5—5 of FIGURE 2 showing the sprocket and drive shaft assembly and gear shift lever assembly.
Figure 6:
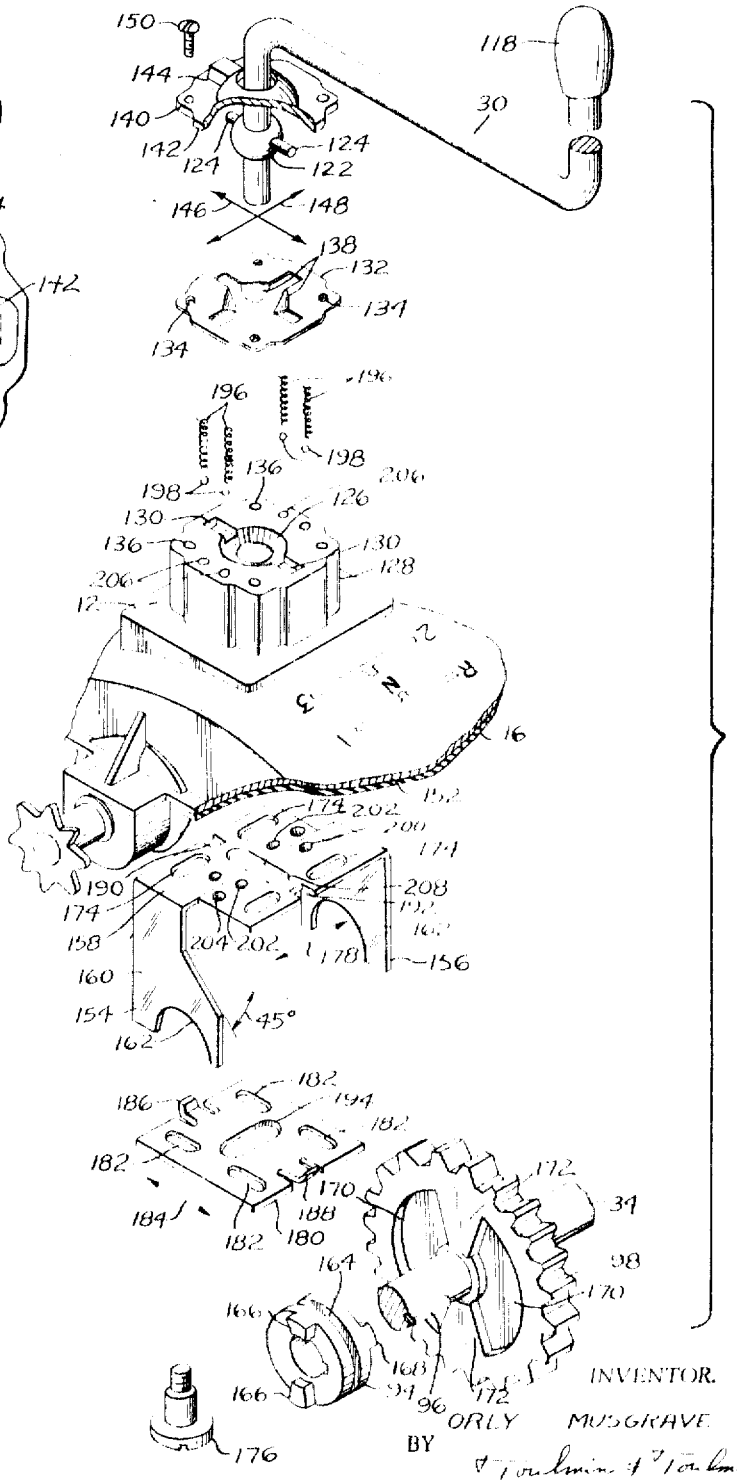
FIGURE 6 is an exploded view in perspective of the yoke shift and stick shift assemblies.

The shift rod assembly 32 shown in FIGURES 3, 4 and 5 is indicated in an exploded perspective view in FIGURE 6. Referring principally to FIGURE 6, there is shown the shift rod 30 which has a suitable knob 118 threadedly attached to the upper end thereof. The lower end of shaft 30 has a knurled portion 120 on to which a shift ball 122 is press fitted. This ball has two trunnions 124 projecting outwardly from the ball and spaced 180 degrees apart as shown.

The ball with the trunnions thereon fits into a generally spherical cavity 126 in the shift housing 128 while the trunnions 124 fit into the generally rectangular recesses 130 of the housing. A spherical spacer spring 132 is used to reduce the friction between ball 122 and the cavity 126.

Figure 7:
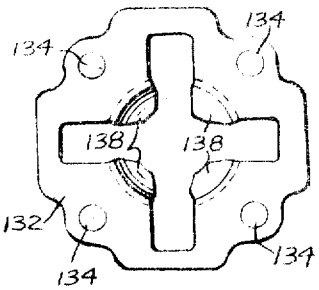
FIGURES 7 and 7A show plan and side views of the spacer spherical spring.
Figure 7A:
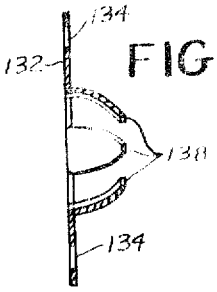

As shown in FIGURE 7 the spacer 132 has a general outline conforming to the outline of housing 128. The spacer has suitable holes 134 which are in alignment with threaded holes 136 of housing 128. The center of the spacer 132 has a general X-shaped section removed therefrom, leaving sections 138. These sections 138 are spherically shaped to conform to the shape of ball 122, and since the ball 122 rests on these sections 138, there is less friction in the shifting of the lever 30.

Figure 10:
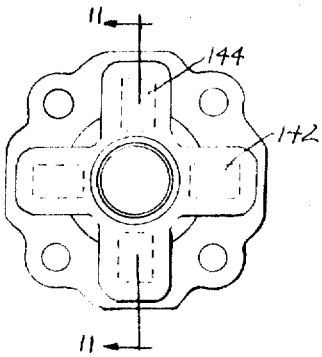
FIGURE 10 shows a top view of the cover on the shift housing.
Figure 11:
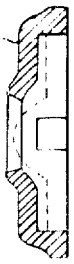
FIGURE 11 shows a view taken along lines 11—11 of FIGURE 10.

The cap 140 for the shift rod assembly is shown in FIGURES 10 and 11. The cap has two sets of recesses 142 and 144 similar to recess 130 of housing 128 and these sets of recesses intersect at right angles to each other.

When either set of recesses 142 or 144 is positioned over recesses 130, the shift rod 30 can be rocked in a direction along the lines indicated by the arrow 146. The shift rod 30 can also be rocked along the line indicated by the arrow 148. The cover 140 and the shift rod 30 along with spacer 132 are retained in the threaded holes 136 of housing 128 by screws 150.

Directly under the housing cover 12 in the area 152 there are positioned two yoke members 154 and 156. The yoke members 154 and 156 are identical; however, they are positioned oppositely as shown. Each yoke member has a top section 158 and a side section 160. The side section 160 has an arcuate section 162 cut out therefrom to engage a mating recess 164 of the pertaining driving dog.

In FIGURE 6 the driving dog shown is the driving dog 94 shown in FIGURE 2. Since the driving dogs are similar a description of one will suffice. The driving dog has a generally cylindrical shape which has a recess 164 formed on the periphery. There are projections or dogs 166 formed on one side of the driving dog and similar projections 168 formed on the other side. However, projections 168 are at right angles to the projections 166, as shown.

In FIGURE 6 the spur gear shown is spur gear 98. The faces of all the spur gears on shaft 34 which are adjacent to the driving dogs are similar so that a description of one face will suffice.

The face of gear 98 has two recesses 170 formed therein leaving a web-like portion 172. When yoke member 156 is shifted to the right, driving dog 94 is axially slid along shaft 34 and the projections 168 enter into recesses 170 and thereby engage the web members 172 to drivingly engage gear 98.

When driving dog 94 is shifted axially to the left, projections 166 will similarly drivingly engage second gear 66. The driving dog members 78 and 94 are moved axially in either direction from neutral position by the pertaining yoke members 156 and 154, respectively. Driving dog 78 engages gears 58 and 82 in a similar manner to that just described.

The top portions 158 of the yoke members have slots 174 formed therein as shown. A suitable shoulder screw 176 is inserted through these slots 174 and the screw 176 threadedly engages the shift housing 128 as shown in FIGURE 5. The yoke members are free to slide axially along shaft 34 and in slots 174 in the direction shown by the arrow 178.

Positioned directly underneath the yoke member is a reinforcing and locking plate member generally indicated 180. The plate is generally rectangular in shape and has elongated slots 182 in which shoulder screws are inserted and which permit the member 180 to only be moved at right angles to shaft 34 in the direction shown by arrow 184.

The plate 180 has two up-turned members 186 and 188 which selectively engage cutout sections 190 and 192 of yoke members 154 and 156, respectively. The lower end of shift lever 30 fits into elongated slots 194 and enables the lower end of rod 30 to be moved generally axially along shaft 34.

The spring and ball members 196 and 198, respectively, are used to retain the yoke members in their various positions. There are depressions 200, 202, and 204 formed on the surface of yoke member 156, for example, to receive ball members 198. When the yoke members are positioned under the cover 12, the ball members 198 are inserted in holes 206 which extend through housing 128 and the balls thereby engage the pertaining yoke member. The spring member 196 forces the ball into contact with the yoke member.

The following is a description of the shifting operation:

When the shift lever 30 is in neutral position, upturned members 186 and 188 of plate respectively engage cutout sections 190 and 192 of the yoke member thereby preventing any axial movement of the members along the line 178. This keeps both driving dogs 78 and 94 in the neutral position.

When shifting into third gear, for example, the gear shift lever is moved towards the rear, as indicated by arrow 146. This moves locking plate 180 forwardly, thereby advancing member 186 into deeper engagement with recess 190 of yoke member 154 while disengaging member 188 completely from recess 192. This permits the yoke member 156 to be shifted axially either to the right or left.

Since the lower end of the lever 30 engages the yoke member 156 at area 208, the yoke member can then be pushed axially to the right, thereby bringing driving dog 94 into driving engagement with gear 98 which is third speed forward. With the shift lever in this position a ball 198 drops into the mating recess 204 of yoke member 156 and keeps the driving dog 94 in engagement with gear 98 until it is desired to change it.

When the yoke members are in neutral position, a spring loaded ball 198 drops into recess 200 of the yoke members to lock the yoke members 154 and 156 in neutral. A spring loaded ball 198 drops into recess 202 of yoke member 156 to retain the yoke member in second position when the yoke member 156 is moved axially to the left to drivingly engage dog 94 with second spur gear 66.

The operation of shifting to obtain the reverse speed and first speed is similar to that just explained.

It will be understood that this invention is susceptible to modification in order to adapt it to different usages and conditions and accordingly, it is desired to comprehend such modifications within this invention as may fall within the scope of the appended claims.

What I claim is:

1. A multi-speed transmission comprising; housing means, a driving and a driven shaft rotatably mounted in said housing means, an intermediate shaft rotatably mounted in said housing means and parallel to said driven shaft and at right angles to said driving shaft, a first plurality of speed changing gears mounted on said intermediate shaft, a driving pinion gear fixed to rotate with said driving shaft and adapted to drive said first plurality of gears, a second plurality of speed changing gears rotatably mounted on said driven shaft and restrained from axial movement thereon, said second plurality of gears being in mesh with said first plurality of gears and each gear of said second plurality having a recess on one side thereof, two driving dogs each being keyed to rotate with said driven shaft but axially movable thereon between two gears of said second plurality of gears, each said driving dog having a neutral and two gear engagement positions, separate yoke means engaging each said driving dog, said yoke means being secured to said housing means and slidable in an axial direction along said driven shaft for axially moving said driving dogs into selective driving engagement with the said recesses of the pertaining gears of said second plurality of gears, and gear shift lever means mounted in said housing means having a neutral position for locking said yoke means in a neutral position and movable for selectively moving each said separate yoke means in an axial direction to move the pertaining driving dog into driving engagement while continuing to lock the other yoke means and the pertaining driving dog in a neutral position.

2. A multi-speed transmission comprising; housing means, a driving and a driven shaft rotatably mounted in said housing means, an intermediate shaft parallel to said driven shaft and at right angles to said driving shaft and rotatably mounted in said housing means, a first bevel gear fixed to said intermediate shaft to rotate therewith, a second bevel gear and a first reversing gear fixed to rotate together on said intermediate shaft, a first plurality of forward speed changing gears fixed on said intermediate shaft to rotate therewith, a second reversing gear and a second plurality of forward speed changing gears rotatably mounted on said driven shaft to rotate thereon and being in mesh with the pertaining first reversing gear and the pertaining gears of said first plurality of forward speed changing gears, a driving pinion gear fixed on one end of said driving shaft to rotate therewith and being in driving engagement with said first and second bevel gears, a pair of driving dogs keyed to rotate with said driven shaft but axially movable thereon and each dog having a neutral and an engagement position, separate yoke means engaging each said driving dog for axially moving the pertaining driving dog into driving engagement with the said second reversing gear and said second plurality of forward speed changing gears on said driven shaft, and gear shift lever means for selectively actuating only one of said yoke means at a time to axially move one of said dogs into driving engagement with the pertaining gear on said driven shaft while maintaining the other dog of said pair in a neutral position.

3. A multi-speed transmission comprising; housing means, a driving and a driven shaft rotatably mounted in said housing means, an intermediate shaft parallel to said driven shaft and at right angles to said driving shaft and rotatably mounted in said housing means, a first bevel gear fixed to said intermediate shaft to rotate therewith, a second bevel gear and a first reversing gear fixed to rotate together on said intermediate shaft, a first plurality of forward speed changing gears fixed on said intermediate shaft to rotate therewith, a second reversing gear and a second plurality of forward speed changing gears rotatably mounted on said driven shaft to rotate thereon and being in mesh with the pertaining first reversing gear and the pertaining gears of said first plurality of forward speed changing gears, a driving pinion gear fixed on one end of said driving shaft to rotate therewith and being in driving engagement with said first and second bevel gears, a first driving dog keyed to rotate with said driven shaft but axially movable thereon between said second reversing gear and one of said second plurality of gears, a second driving dog keyed to rotate with said driven shaft but axially movable thereon between the remaining two of said second plurality of gears, said first and second driving dogs having neutral and engagement positions, separate yoke means engaging each said driving dog for selectively axially moving the pertaining driving dog into driving engagement with the pertaining gear on said driven shaft, and gear shift lever means for selectively actuating only one of said yoke means at a time to axially move one of said driving dogs into driving engagement with the pertaining gear on said driven shaft while maintaining the other dog in a neutral position.

4. A multi-speed transmission comprising; housing means, a driving and a driven shaft rotatably mounted in said housing, an intermediate shaft rotatably mounted in said housing means and parallel to said driven shaft and at right angles to said driving shaft, a first bevel gear fixed to said intermediate shaft to rotate therewith, a second bevel gear and a first reversing gear fixed to rotate together on said intermediate shaft, a first plurality of forward speed changing gears fixed on said intermediate shaft to rotate therewith, a second reversing gear rotatably mounted on said driven shaft and in mesh with said first reversing gear, a second plurality of forward speed changing gears rotatably mounted on said driven shaft to rotate thereon and being in mesh with the pertaining gear of said first plurality of gears, a driving pinion gear fixed on one end of said driving shaft to rotate therewith and being in driving engagement with said first and second bevel gears, a first driving dog keyed to rotate with said driven shaft but axially movable thereon between said second reversing gear and one of said second plurality of gears, a second driving dog keyed to rotate with said driven shaft but axiall ymovable thereon between the remaining two of said second plurality of gears, said first and second driving dogs having neutral and gear engagement positions, separate yoke means engaging each said driving dog and slidably secured to said housing means for selectively axially moving the pertaining driving dog into driving engagement with the pertaining gear on either side thereof, gear shift lever means pivotally mounted in said housing means comprising a gear shift having a lower end in engagement with said yoke means for selectively moving said yoke means to bring the pertaining driving dog into driving engagement with the pertaining gear on either side thereof, and means responsive to said lower end of the shift lever to lock one said yoke means and the pertaining dog in neutral position while the other yoke means is moved to bring the pertaining dog into driving engagement with one of the pertaining gears on either side thereof.

5. The transmission as claimed in claim 4 in which each separate yoke means has a locking recess therein and in which said means responsive to said lower end of said shift lever comprises a yoke locking means slidably secured to said housing means and having projections thereon to selectively engage the said locking recesses on said yoke means in response to movements of the lower end of said shift lever.

6. The transmission as claimed in claim 5 in which said gear shift lever means further comprises, a gear shift lever housing and cover means therefor secured to said housing means and having a generally spherical cavity therein and generally rectangular recesses communicating with said spherical cavity, and said shift lever having a spherical ball member fixed intermediate the ends thereof, trunnions extending from said ball member, said ball member and trunnions cooperating with said cavity and recesses in said lever housing to enable said shift lever to be pivoted therein.

7. A multi-speed transmission comprising; housing means, a driving and a driven shaft rotatably mounted in said housing, an intermediate shaft rotatably mounted in said housing means and parallel to said driven shaft and at right angles to said driving shaft, a first bevel gear fixed to said intermediate shaft to rotate therewith, a second bevel gear and a first reversing gear fixed to rotate together on said intermediate shaft, a first plurality of forward speed changing gears fixed on said intermediate shaft to rotate therewith, a second reversing gear rotatably mounted on said driven shaft and in mesh with said first reversing gear, a second plurality of forward speed changing gears rotatably mounted on said driven shaft to rotate thereon and being in mesh with the pertaining gears of said first plurality of gears, a driving pinion gear fixed on one end of said driving shaft to rotate therewith and being in driving engagement with said first and second bevel gears, a first driving dog keyed to rotate with said driven shaft but axially movable thereon between said second reversing gear and one of said second plurality of gears, a second driving dog keyed to rotate with said driven shaft but axially movable thereon between the remaining of said second plurality of gears, said first and second driving dogs having neutral and gear engagement positions, said first and second driving dogs being of generally cylindrical shape having projections extending from either side thereof and also having an annular recess formed on the periphery thereof, each gear of said second plurality of gears and said second reversing gear having recesses on one side thereof to form a web portion for engagement with said projections on said driving dogs, yoke means for each driving dog having a first portion slidably secured to said housing means and having a second portion joined to and depending from said first portion, said second portion having an arcuate recess therein adapted to engage the said annular recess on the pertaining driving dog, each said yoke means also having a locking recess on one side of said first portion and a second recess on the opposite side thereof, gear shift lever means pivotally mounted in said housing means comprising, a shift lever having a lower end adapted for engagement with said first portion of said yoke means for selectively moving said yoke means in an axial direction along said driven shaft to move the pertaining driving dog into driving engagement wth the pertaining gear on either side thereof, a shift lever housing and cover means therefor secured to said housing means and having a generally spherical cavity therein and generally rectangular recesses communicating with said spherical cavity, a spherical ball member fixed intermediate the ends of said shift lever, trunnions extending from opposite sides of said ball member in axial alignment with each other, said ball member and trunnions cooperating with said cavity and recesses of said lever housing to enable said shift lever to be pivoted therein, spherical spacer means between said ball member and spherical cavity, and a locking plate having a recess therein for engagement with the lower end of said shift lever and a projecting member on opposite sides of said locking plate adapted to engage the locking recess of the pertaining yoke means, said locking plate being slidably secured to said housing means and adaptable to slide only in a direction normal to the axis of said driven shaft in response to movements of said shift lever, said locking plate being further adaptable to engage both said locking recesses of said yoke means when the shift lever is in neutral position and to engage the locking recess of each yoke means while the other yoke means is being axially moved along the said driven shaft.

[8. A shift mechanism comprising; housing means, a shift lever pivotally mounted in said housing means and having a lower end extending below said housing means, a pair of actuating members having normally aligned recesses defining a slot for engagingly receiving said lower end, said actuating members being reciprocally slidably secured to said housing means, and locking means slidably secured to said housing means and also engaging said lower end and being responsive to movements therefrom for locking both of said actuating members in a neutral position of said shift lever and for releasing a selected member for motion with said shift lever while continuing to hold locked the other member.]

[9. A shift mechanism comprising; housing means, a shift lever pivotally mounted in said housing means and having a lower end extending below said housing means, a pair of actuating members each having a recess therein for engagingly receiving said lower end, said actuating members being reciprocally slidably secured to said housing means, each said actuating member also having a second recess on one side thereof, and locking means reciprocally slidably secured to said housing means and having a recess therein for engagement with said lower end, a proejcting member extending from each side of opposite sides of said locking means and adapted to engage one of said second recesses, said locking means being slidable in a direction at right angles to the reciprocating paths of said actuating members in response to movements of said lower end for locking each one of said actuating means while permitting the other actuating means to be reciprocated.]

10. A shift mechanism comprising; housing means, a shift lever pivotally mounted in said housing means and having a lower end extending below said housing means, said housing means having a generally spherical cavity therein and generally rectangular recesses communcating with said cavity, a spherical ball member fixed intermediate the ends of said shift lever, trunnions, extending from opposite sides of said ball member in axial alignment with each other, said ball member and trunnions cooperating with said cavity and generally rectangular recesses to enable said shift lever to be pivoted therein, cover means to retain said lever in said housing means, a pair of actuating members each having a recess therein for engagingly receiving said lower end, said actuating members being reciprocally slidably secured to said housing means, each said actuating member also having a second recess on one side thereof, and locking means reciprocally slidably secured to said housing means and having a recess therein for engagement with said lower end, a projecting member extending from each side of opposite sides of said locking means and adapted to engage one of said second recesses, said locking means being slidable in a direction at right angles to the reciprocating paths of said actuating members in response to movement of said lower end for locking each one of said actuating means while permitting the other actuating means to be reciprocated.

11. A multi-speed transmission comprising; housing means, a driving and a driven shaft rotatably mounted in said housing means, an intermediate shaft rotatably mounted in said housing means and parallel to said driven shaft and at right angles to said driving shaft, a first plurality of speed changing gears mounted on said intermediate shaft, a driving pinion gear fixed to rotate with said driving shaft and adapted to drive said first plurality of gears, a second pluarlity of speed changing gears rotatably mounted on said driven shaft and restrained from axial movement thereon, said second plurality of gears being in mesh with said first plurality of gears and each gear of said second plurality having a recess on one side thereof, two driving dogs each being keyed to rotate with said driven shaft but axially movable thereon between two gears of said second plurality of gears, each said driving dog having a neutral and two gear engagement positions, separate yoke means engaging each said driving dog, said yoke means being secured to said housing means and slidable in an axial direction along said driven shaft for axially moving said driving dogs into selective driving engagement with the said recesses of the pertaining gears of said second plurality of gears, and gear shift lever means mounted in said housing means for selectively moving each said separate yoke means in an axial direction to move the pertaining driving dog into driving engagement while maintaining the other yoke means and the pertaining driving dog in a neutral position, each said separate yoke means having a locking recess and a second recess for receiving the end of the shaft lever, said gear shift lever means comprising, a gear shift lever pivotally mounted in said housing means and having a lower end engaging said second recesses, and yoke locking means movably secured to said housing means and having a recess therein for receiving the lower end of said shift lever, said locking means also having projections thereon to selectively engage the locking recesses of said yoke means in response to movements of said shift lever.

12. In a multi-speed transmission having a pair of clutch dogs adjustable for speed selection, a pair of dog actuating members in a side by side relatively longitudinally reciprocable relation and drivingly connected to respective clutch dogs, adjacent marginal edges of said members each having a recess, locking means for holding said members in a position aligning said recesses to define an elongated slot, said locking means being adjustable to alternate positions selectively releasing one of said actuating members while continuing to lock the other, a shift lever having a portion received in said slot and adjustable in a first sense selectively to place said portion in one of said recesses exclusively of the other whereby to select one only of said actuating members for motion in response to movement of said lever in a second sense, means for making an appropriate adjustment of said locking means to one of its alternate positions in accompaniment with selective adjustment of said shift lever, and a housing enclosing said actuating members and providing a pivotal mounting for said shift lever and a sliding mounting for said locking means.

13. A multi-speed transmission according to claim 12, characterized in that said locking means is a plate having motion in response to movement of said lever in said one sense, said plate having portions engageable with respective actuating members and repsonding to motion of said lever in said one sense to disengage from one of said actuating members, releasing said one actuating member for motion with said shaft means in said second sense.

14. A multi-speed transmission according to claim 12, characterized in that said locking means comprises a locking plate having spaced apart projections thereon, said actuating members having recesses in margins opposite said adjacent marginal edges receiving said projections in a neutral position of said plate, said plate being in an aligned adjacent relation to said actuating members and having a slot receiving said portion of said shift lever, said slot in said locking plate being elongated in a sense transverse to the elongation of the said slot defined by the first said recesses in said actuating members, whereby said locking plate is moved by said shift lever in response to motion thereof in said first sense but is unmoved by motion of said lever in said second sense.

15. A multi-speed transmission, comprising a housing, shaft means mounted in said housing, including a shaft having a plurality of gears mounted thereon to be selectively coupled thereto, clutch dogs connected to said shaft for unison rotary and relative longitudinal motions and disposed between gears to engage selected gears, said housing occupying an enclosing relation to said gears and clutch dogs, a yoke assembly having legs engaged with respective clutch dogs, said legs being in embracing relation to certain of the gears of said plurality of gears and having other portions in adjacent parallel relation to said housing, said yoke assembly comprising individual actuating members, the said other portions of which are in a side by side relation overlying said certain gears, a shift lever pivotally mounted in said housing and extending into cooperative relation with said other portions of said actuating members of said yoke assembly, said other portions respectively having recesses selectively engaged by said shift lever for selected reciprocation of said actuating members by said lever, and a locking plate in an aligned superposed relation to said other portions of said yoke assembly and movable by said shift lever to alternate positions selectively releasing one of said actuating members for movement by said shift lever while continuing to lock the other, said locking plate being slidably mounted to the underside of said housing.

*16. A multi-speed transmission, comprising housing means, a driving and driven shaft rotatably mounted in said housing means, an intermediate shaft parallel to said driven shaft and at right angles to said driving shaft and rotatably mounted in said housing means, means for rotating said intermediate shaft from said driving shaft, plural sets of drivingly related gears on said intermediate and driven shaft defining different forward speed drives, the gears on one of said intermediate and driven shafts being fixed thereto for unison rotation and companion gears on the other one thereof being rotatable thereon, a plurality of dogs mounted on the said other shaft for unison rotary and relative axial motion, said dogs being axially adjustable into drivingly related engagement with selected gears on said other shaft and into respective intermediate neutral positions, separate yoke means engaging each of said driving dogs for axially moving the pertaining driving dog to selected positions of adjustment, and gear shift lever means for selectively actuating only one of said yoke means at a time independently to move one of said dogs into driving engagement with a pertaining gear on said other shaft.*

*17. A multi-speed transmission according to claim 16, characterized by a reversing drive connection between said intermediate and diven shafts including gear means*

*rotatable on said other shaft in side by side relation to the other said gears thereon, there being a pair of driving dogs, one dog being positioned between a pair of the other said gears and movable alternately therebetween and to a neutral intermediate position, and the other dog being positioned between another one of the other said gears and said gear means and movable alternatively therebetween and to a neutral intermediate position, said dogs being selected for operation and moved in a selected direction for forward drive at a selected speed or for reverse drive, a selected dog of the pair being movable into driving engagement with a pertaining gear or gear means on said other shaft while the other dog of the air is maintained in a neutral position.*

*18. A multi-speed transmission comprising; housing means, a driving and a driven shaft rotatably mounted in said housing means, an intermediate shaft rotatably mounted in said housing means and parallel to said driven shaft and at right angles to said driving shaft, rotating said intermediate shaft from said driving shaft, plural sets of drivingly related gears on said intermediate and driven shafts, the gears on one of said intermediate and driven shafts being fixed thereto for unison rotation and companion gears on the other one thereof being rotatable thereon, each of said companion gears having engaging means on a side thereof, two driving dogs each being keyed to rotate with said other shaft but axially movable thereon between two of said companion gears to engage said engaging means thereon, each said driving dog having a neutral and two gear engagement positions, separate yoke means engaging each said driving dog, said yoke means being secured to said housing means and slidable in an axial direction along said other shaft for axially moving said driving dogs into selective driving engagement with the said pertaining gears of said companion gears, and gear shift lever means mounted in said housing means for selectively moving each said yoke means in an axial direction to move the pertaining driving dog into driving engagement while maintaining the other yoke means and the pertaining driving dog in a neutral position, each said separate yoke means having a locking portion and a recess for receiving the end of the shift lever, said gear shift lever means comprising, a gear shift lever pivotally mounted in said housing means and having a lower end engaging said recesses, and yoke locking means movably secured to said housing means and having a recess therein for receiving the lower end of said shift lever, said locking means also having locking portions thereon to selectively engage the locking portions of said yoke means in response to movements of said shift lever.*

*19. A compact multi-speed gear transmission with manual shift means for use on riding mowers and like*

*motor vehicles, including a housing comprised of upper and lower housing components, a driving shaft entering said housing through the lower component and a shift rod entering the housing through the upper component, said driving shaft and said shift rod being in a generally opposed relation, said housing components providing at their juncture shaft bearings parallel to one another and spaced in lines at right angles to said driving shaft and to said shift rod, first and second shafts supported in said bearings, said first shaft extending at one end through and beyond its respective bearing to project outside said housing, sprocket means on the projecting end of said first shaft for delivering power to the vehicle from said transmission, plural sets of drivingly related gears on said first and second shafts defining different forward speed drives, the gears on one of said first and second shafts being fixed thereto for unison rotation and companion gears on the other one thereof being rotatable thereon, driving dogs mounted on the said other shaft in an alternating relation to the gears thereon for unison rotary and relative axial motion, said dogs being individually axially adjustable drivingly to engage selected gears on said other shaft, and separate dog engaging yoke means slidably mounted to the upper interior of said upper housing component to overlie said other shaft, said shift rod being at its inner end in an operating relation to said yoke means and manipulative from outside the housing to accomplish selective sliding movement of said separate yoke means.*

*20. A multi-speed gear transmission according to claim 19, characterized in that the gears on said one shaft include a gear for each of three forward speeds and reverse, there being a companion gear for each on said other shaft and there being a pair of driving dogs, one between each pair of companion gears, one of said dogs being adjustable to select between two different forward speeds and the other being adjustable to select between a third forward speed and reverse.*

References Cited

The following references, cited by the Examiner, are of record in the patented file of this patent or the original patent.

UNITED STATES PATENTS

| | | |
|---|---|---|
| 1,328,062 | 1/1920 | Stewart. |
| 2,435,929 | 2/1948 | Plenco. |
| 3,115,048 | 12/1963 | Cape. |

DONLEY J. STOCKING, Primary Examiner

H. S. LAYTON, Assistant Examiner

U.S. Cl. X.R.

74—335, 477